US010660123B2

(12) United States Patent
Xu et al.

(10) Patent No.: US 10,660,123 B2
(45) Date of Patent: May 19, 2020

(54) METHOD AND APPARATUS FOR OBTAINING CONFIGURATION INFORMATION

(71) Applicant: HUAWEI TECHNOLOGIES CO., LTD., Shenzhen (CN)

(72) Inventors: Xiuqiang Xu, Shanghai (CN); Yan Chen, Shanghai (CN); Yalin Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 103 days.

(21) Appl. No.: 15/872,991

(22) Filed: Jan. 17, 2018

(65) Prior Publication Data

US 2018/0146495 A1 May 24, 2018

Related U.S. Application Data

(63) Continuation of application No. PCT/CN2015/084371, filed on Jul. 17, 2015.

(51) Int. Cl.
*H04W 74/00* (2009.01)
*H04W 76/11* (2018.01)
(Continued)

(52) U.S. Cl.
CPC ..... *H04W 74/004* (2013.01); *H04W 72/0413* (2013.01); *H04W 74/00* (2013.01);
(Continued)

(58) Field of Classification Search
CPC ... H04W 74/004; H04W 74/00; H04W 76/11; H04W 72/0413
See application file for complete search history.

(56) References Cited

U.S. PATENT DOCUMENTS

| 2008/0170521 A1 | 7/2008 | Govindan et al. |
| 2008/0267079 A1 | 10/2008 | Mhatre et al. |

(Continued)

FOREIGN PATENT DOCUMENTS

| CN | 101374066 A | 2/2009 |
| CN | 103369535 A | 10/2013 |

(Continued)

*Primary Examiner* — Ricky Q Ngo
*Assistant Examiner* — Stephen N Steiner
(74) *Attorney, Agent, or Firm* — Kilpatrick Townsend & Stockton LLP

(57) ABSTRACT

The present invention discloses a method and an apparatus for obtaining configuration information of a grant-free transmission unit. A centrally configured network element sends configuration information of a grant-free transmission unit of an access device to the access device, where the grant-free transmission unit refers to a transmission resource used for grant-free transmission, and the configuration information of the grant-free transmission unit includes at least one or more of the following information: information about the grant-free transmission unit or information about a grant-free transmission control mechanism. By using the method and the apparatus for obtaining configuration information of a grant-free transmission unit, an access device can obtain configuration information of a grant-free transmission unit.

15 Claims, 5 Drawing Sheets

(51) Int. Cl.
*H04W 72/04* (2009.01)
*H04W 16/04* (2009.01)

(52) U.S. Cl.
CPC ............ *H04W 76/11* (2018.02); *H04W 16/04* (2013.01); *H04W 74/006* (2013.01)

(56) References Cited

U.S. PATENT DOCUMENTS

| | | |
|---|---|---|
| 2010/0115099 A1 | 5/2010 | Gu et al. |
| 2011/0176500 A1* | 7/2011 | Wager ................. H04W 74/006 370/329 |
| 2015/0011234 A1 | 1/2015 | Wei et al. |
| 2015/0092552 A1* | 4/2015 | Bajj ...................... H04W 28/08 370/235 |
| 2015/0223279 A1 | 8/2015 | Jiao et al. |
| 2016/0219627 A1* | 7/2016 | Au .................... H04W 74/0841 |

FOREIGN PATENT DOCUMENTS

| | | |
|---|---|---|
| CN | 103582127 A | 2/2014 |
| CN | 104684098 A | 6/2015 |
| EP | 3301984 A1 | 4/2018 |
| WO | 2013074462 A1 | 5/2013 |
| WO | 2014090200 A1 | 6/2014 |
| WO | 2014135126 A1 | 9/2014 |

* cited by examiner

METHOD AND APPARATUS FOR OBTAINING CONFIGURATION INFORMATION

CROSS-REFERENCE TO RELATED APPLICATIONS

This application is a continuation of International Patent Application No. PCT/CN2015/084371, filed on Jul. 17, 2015, which is hereby incorporated by reference in its entirety.

TECHNICAL FIELD

The present invention relates to the communications field, and more specifically, to a method and an apparatus for obtaining configuration information.

BACKGROUND

In an existing cellular communications system, such as a Global System for Mobile Communications (English: Global System for Mobile Communication, GSM for short) system, a Wideband Code Division Multiple Access (English: Wideband Code Division Multiple Access, WCDMA for short) system, or a Long Term Evolution (English: Long Term Evolution, LTE for short) system, supported communication is mainly for voice and data communication. Generally, a quantity of connections supported by a conventional base station is limited, and conventional communication is easy to implement.

A next-generation mobile communications system supports not only conventional communication but also M2M (English: Machine to Machine) communication, which is also known as MTC (English: Machine Type Communication) communication. It is predicted that a quantity of MTC devices connected to a network will be up to 50 billion to 100 billion by 2020, and far more than a quantity of existing connections. M2M services have diversified service types, and therefore have highly different requirements for a network. Roughly, there are the following several requirements:

reliable but delay-insensitive transmission; and ultra-reliable and low latency transmission.

A service that requires reliable and delay-insensitive transmission is easy to process. However, an ultra-reliable and low latency transmission service, such as a V2V (English: Vehicle to Vehicle) service, requires transmission to be not only low-delay but also reliable. If transmission is unreliable, retransmission is caused. As a result, a transmission delay is excessively long, and cannot meet requirements.

Existence of a large quantity of connections makes a future wireless communications system highly different from an existing communications system. For the large quantity of connections, more resources need to be consumed to connect terminal devices, and more resources need to be consumed to transmit scheduling signaling related to data transmission of the terminal devices.

Therefore, a grant-free transmission method is proposed, thereby reducing a delay and meeting reliable transmission at least to some extent. In addition, even ultra-reliability can be achieved by means of the solution design.

However, in the prior art, there are no solutions for configuring a grant-free transmission resource and for obtaining related information.

SUMMARY

In view of this, embodiments of the present invention provide a method and an apparatus for obtaining configuration information of a grant-free transmission unit.

According to a first aspect, a method for obtaining configuration information of a grant-free transmission unit is provided, where the method includes: sending, by a centrally configured network element, configuration information of a grant-free transmission unit of an access device to the access device, where the grant-free transmission unit refers to a transmission resource used for grant-free transmission, and the configuration information of the grant-free transmission unit includes at least one or more of the following information: information about the grant-free transmission unit or information about a grant-free transmission unit control mechanism; and receiving, by the access device, the configuration information that is of the grant-free transmission unit of the access device and that is sent by the centrally configured network element, where the information about the grant-free transmission unit is one or more of the following information: time-domain resource information, frequency-domain resource information, space-domain resource information, code-domain resource information, or pilot resource information; and the information about the grant-free transmission control mechanism is one or more of the following information: uplink power control information, modulation and coding scheme information, or retransmission mechanism information.

According to a second aspect, an apparatus for obtaining configuration information of a grant-free transmission unit is provided, where the apparatus includes a receiver, and the receiver is configured to receive configuration information of a grant-free transmission unit of the apparatus, where the grant-free transmission unit refers to a transmission resource used for grant-free transmission, and the configuration information of the grant-free transmission unit includes at least one or more of the following information: information about the grant-free transmission unit or information about a grant-free transmission unit control mechanism, where the information about the grant-free transmission unit is one or more of the following information: time-domain resource information, frequency-domain resource information, space-domain resource information, code-domain resource information, or pilot resource information; and the information about the grant-free transmission control mechanism is one or more of the following information: uplink power control information, modulation and coding scheme information, or retransmission mechanism information.

According to a third aspect, an apparatus for obtaining configuration information of a grant-free transmission unit is provided, where the apparatus includes a transmitter, and the transmitter is configured to send configuration information of a grant-free transmission unit of an access device to the access device, where the grant-free transmission unit refers to a transmission resource used for grant-free transmission, and the configuration information of the grant-free transmission unit includes at least one or more of the following information: information about the grant-free transmission unit or information about a grant-free transmission unit control mechanism, where the information about the grant-free transmission unit is one or more of the following information: time-domain resource information, frequency-domain resource information, space-domain resource information, code-domain resource information, or pilot resource information; and the information about the grant-free transmission control mechanism is one or more of the following information: uplink power control information, modulation and coding scheme information, or retransmission mechanism information.

Based on the foregoing technical solutions, according to the method and the apparatus for obtaining configuration information in the embodiments of the present invention, a centrally configured network element sends configuration information of a grant-free transmission unit to an access device. In this way, the access device can obtain the configuration information of the grant-free transmission unit, so that a grant-free service of a terminal device that is covered, controlled, or served by the access device can be smoothly carried out.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

Figure 1:
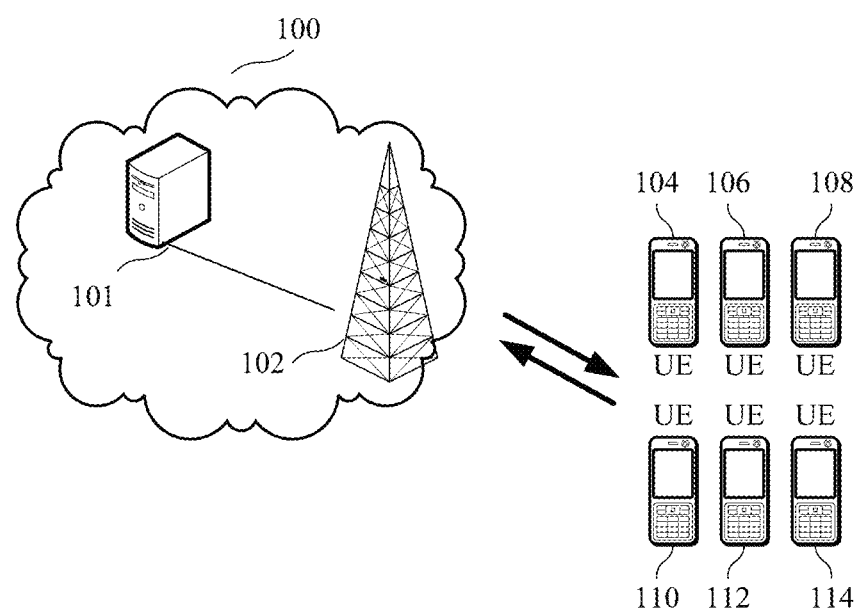
FIG. 1 is a schematic diagram of an application scenario according to an embodiment of the present invention.

FIG. 1 provides a simplified schematic network diagram. In a network 100, for example, there is a centrally configured network element 101 and an access device 102. The centrally configured network element 101 and the access device 102 are connected to several terminal devices 104 to 114 (UE for short in the figure) in a wireless or wired manner, or in another manner.

A network in this patent may be a public land mobile network (English: Public Land Mobile Network, PLMN for short), a D2D network, an M2M network, an MTC network, or another network. FIG. 1 is merely an example of a simplified schematic diagram. The network may further include another access device that is not illustrated in FIG. 1.

The centrally configured network element in this patent application may be a mobility management entity (English: Mobile Management Entity, MME for short), a serving gateway (English: Serving Gateway, S-GW for short), a packet data network gateway (English: Packet Data Network-Gateway, PDN-GW for short), or another network device; or may serve as a logical function node and is located in a network element on a core network, an access network, or another network level.

The terminal device in this patent application may be user equipment (English: User Equipment, UE for short), an access terminal, a subscriber unit, a subscriber station, a mobile site, a mobile station, a remote station, a remote terminal, a mobile device, a user terminal, a terminal, radio communications equipment, a user agent, or a user apparatus. The access terminal may be a cellular phone, a cordless phone, a Session Initiation Protocol (English: Session Initiation Protocol, SIP for short) phone, a wireless local loop (English: Wireless Local Loop, WLL for short) station, a personal digital assistant (English: Personal Digital Assistant, PDA for short), a handheld device that has a wireless communication function, a computing device or another processing device that is connected to a wireless modem, an in-vehicle device, a wearable device, a terminal device in a future 5G network, a terminal device in a future evolved PLMN network, or the like.

The access device in this patent application may be a device configured to communicate with a terminal device. The access device may be a BTS (English: Base Transceiver Station) in GSM or Code Division Multiple Access (English: Code Division Multiple Access, CDMA for short), or may be an NB (English: NodeB) in WCDMA, or may be a baseband unit (English: Base Band Unit, BBU for short) set (certainly, a person skilled in the art may know that the BBU set may have another name) in a cloud radio access network (English: Cloud Radio Access Network, CRAN for short) scenario, or may be an eNB or eNodeB (English: evolved Node B) or an access point in LTE, an in-vehicle device, a wearable device, a network-side device in a future 5G network, or an access device in a future evolved PLMN network.

To deal with a large quantity of MTC services in a network in the future, or to meet ultra-reliable and low latency service transmission, this patent proposes a grant-free transmission solution. English for grant-free transmission may be represented as grant free. Grant-free transmission may be understood as any one or more of the following meanings, or a combination of some technical features in multiple meanings, or a similar meaning:

The grant-free transmission may mean that: an access device pre-allocates multiple transmission resources and notifies a terminal device of the multiple transmission resources; when there is an uplink data transmission requirement, the terminal device selects at least one transmission resource from the multiple transmission resources pre-allocated by the access device, and uses the selected transmission resource to send uplink data; and the access device detects, on one or more transmission resources of the multiple pre-allocated transmission resources, the uplink data sent by the terminal device. The detection may be blind detection, or may be performed according to a control field in the uplink data, or may be performed in another manner.

The grant-free transmission may mean that: an access device pre-allocates multiple transmission resources and notifies a terminal device of the multiple transmission resources, so that when there is an uplink data transmission requirement, the terminal device selects at least one transmission resource from the multiple transmission resources pre-allocated by the access device, and uses the selected transmission resource to send uplink data.

The grant-free transmission may mean that: information about multiple pre-allocated transmission resources is obtained; and when there is an uplink data transmission requirement, at least one transmission resource is selected from the multiple transmission resources, and uplink data is sent by using the selected transmission resource. The information about the multiple pre-allocated transmission resources may be obtained from an access device.

The grant-free transmission may mean a method by using which uplink data transmission of a terminal device can be implemented without dynamic scheduling performed by an access device, where the dynamic scheduling may be a scheduling manner in which the access device indicates, by using signaling, a transmission resource for each uplink data transmission of the terminal device. Optionally, implementing uplink data transmission of a terminal device may be understood as allowing two or more terminal devices to perform uplink data transmission on a same time-frequency resource. Optionally, the transmission resource may be a transmission resource of one or more transmission time units after a moment at which UE receives the signaling. One transmission time unit may be a minimum time unit of one transmission, for example, a TTI (English: Transmission Time Interval), and its value may be 1 ms, or may be a preset transmission time unit.

The grant-free transmission may mean that: a terminal device performs uplink data transmission without a grant from an access device, where the grant may mean that: the terminal device sends an uplink scheduling request to the access device, and after receiving the scheduling request, the access device sends an uplink grant to the terminal device, where the uplink grant is used to indicate an uplink transmission resource allocated to the terminal device.

The grant-free transmission may mean a contention-based transmission manner, and specifically, may mean that: multiple terminals simultaneously perform uplink data transmission on a same pre-allocated time-frequency resource without a grant from a base station.

The data may include service data or signaling data.

The blind detection may be understood as detection performed, without foreknowledge of whether there is arrived data, on data that may arrive. The blind detection may also be understood as detection performed without an explicit signaling indication.

The foregoing transmission resource may include but is not limited to one or a combination of the following resources:

a time-domain resource, such as a radio frame, a subframe, or a symbol;

a frequency-domain resource, such as a subcarrier or a resource block;

a space-domain resource, such as a transmit antenna or a beam;

a code-domain resource, such as a sparse code multiple access (English: Sparse Code Multiple Access, SCMA for short) codebook, a low density signature (English: Low Density Signature, LDS for short) sequence, or a CDMA code; or a pilot resource.

The foregoing grant-free transmission may be transmission performed according to one or more of the following control mechanisms, including but not limited to:

uplink power control, such as uplink transmit power upper limit control;

modulation and coding scheme setting, such as transport block size setting, code rate setting, or modulation order setting; and a transmission mechanism, such as a HARQ mechanism.

A grant-free transmission unit may be a basic transmission resource for grant-free transmission, and may be one or a combination of the following resources for grant-free transmission:

a time-domain resource, such as a radio frame, a subframe, or a symbol;

a frequency-domain resource, such as a subcarrier, a resource block, or a sub-band;

a space-domain resource, such as a transmit antenna or a beam;

a code-domain resource, such as a sparse code multiple access (English: Sparse Code Multiple Access, SCMA for short) codebook, a low density signature (English: Low Density Signature, LDS for short) sequence, or a CDMA code; or a pilot resource.

Certainly, a grant-free transmission unit may be known as another name by a person skilled in the art.

The application with Patent No. PCT/CN2014/073084 and entitled "SYSTEM AND METHOD FOR UPLINK GRANT-FREE TRANSMISSION SCHEME" provides a technical solution of uplink grant-free transmission. Content of the application PCT/CN2014/073084 may also be understood as a part incorporated into content of the embodiments of the present invention by reference, and details are not described herein.

Generally, an access device configures one or more grant-free transmission units, to perform grant-free data transmission better. In addition, optionally, a grant-free transmission unit may be in terms of a cell, that is, a grant-free transmission unit of an access device may be understood as a grant-free transmission unit for one or more cells controlled by the access device, and that the access device configures the grant-free transmission unit may be understood as that the access device configures the grant-free transmission unit for a cell controlled by the access device.

Configuration information of the grant-free transmission unit may include but is not limited to information about the grant-free transmission unit or information about a grant-free transmission unit control mechanism.

The information about the grant-free transmission unit includes but is not limited to one or more of the following information:

time-domain resource information, such as radio frame information, subframe information, and symbol information;

frequency-domain resource information, such as subcarrier information, resource block information, and sub-band information;

space-domain resource information, such as transmit antenna information and beam information;

code-domain resource information, such as SCMA codebook information, LDS sequence information, and CDMA code information; or pilot resource information.

The information about the grant-free transmission unit control mechanism includes but is not limited to one or more of the following information:

modulation and coding scheme information, such as transport block size information, code rate information, and modulation order information;

uplink power control information, such as uplink transmit power upper limit information; or retransmission mechanism information, such as HARQ information.

The foregoing information may be understood as indication information in any form, which may be a specific value, an index, or another form.

The foregoing descriptions may be applicable to the following embodiments.

Figure 2:
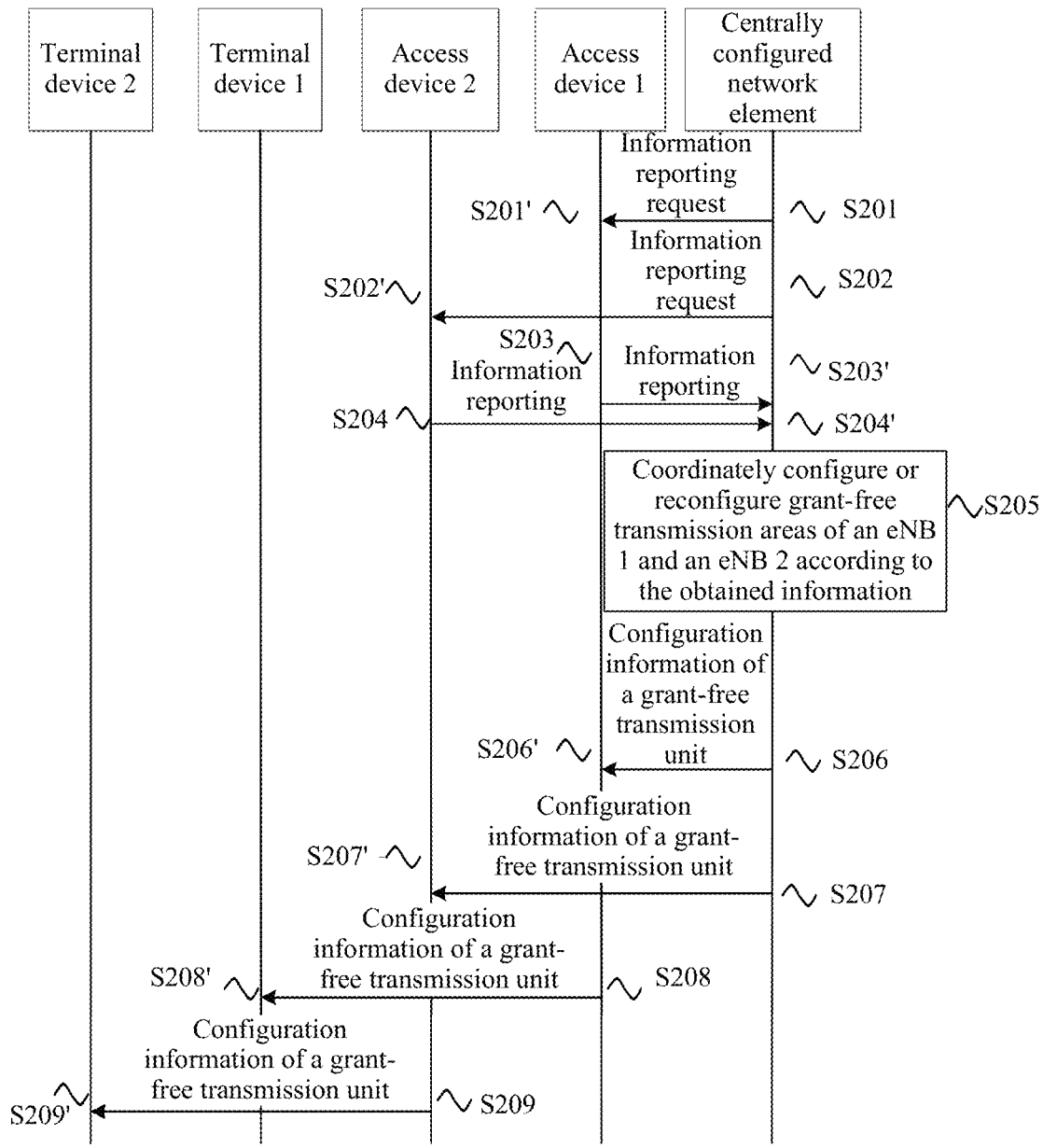
FIG. 2 is a schematic flowchart of a method for obtaining configuration information of a grant-free transmission unit according to an embodiment of the present invention.

FIG. 2 shows a method for obtaining information used for grant-free transmission unit configuration, a method for obtaining configuration information of a grant-free transmission unit, and a method for configuring a grant-free transmission unit according to an embodiment of the present invention. In the schematic embodiment, an access device 1 and an access device 2, as an example, represent one or more access devices connected to a centrally configured network element, and in implementation, there may be more than two access devices. There may be one or more terminal devices within a coverage area of an access device. FIG. 2 merely uses one terminal as an example.

As shown in FIG. 2, the method 200 includes the following steps:

S201: The centrally configured network element sends an information reporting request message to the access device 1, where the information reporting request message is used to request the access device 1 to send information used for grant-free transmission unit configuration to the centrally configured network element. This step is optional, and the centrally configured network element may periodically or aperiodically send the information reporting request message.

S201': The access device 1 receives the information reporting request message sent by the centrally configured network element. This step is optional. Further, optionally, after receiving the information reporting request message, the access device 1 sends a feedback message about the information reporting request to the centrally configured network element (not shown in the figure).

S202: The centrally configured network element sends an information reporting request message to the access device 2, where the information reporting request message is used to request the access device 2 to send information used for grant-free transmission unit configuration to the centrally configured network element. This step is optional, and the centrally configured network element may periodically or aperiodically send the information reporting request message.

S202': The access device 2 receives the information reporting request message sent by the centrally configured network element. This step is optional. Further, optionally, after receiving the information reporting request message, the access device 2 sends a feedback message about the information reporting request to the centrally configured network element (not shown in the figure).

S203: The access device 1 sends the information used for grant-free transmission unit configuration to the centrally configured network element. This step is optional, and the access device 1 may periodically or aperiodically send the information used for grant-free transmission unit configuration.

S203': The centrally configured network element receives the information that is used for grant-free transmission unit configuration and that is sent by the access device 1. This step is optional. Further, optionally, after receiving the information, the centrally configured network element sends a feedback message about the received information to the access device 1 (not shown in the figure).

S204: The access device 2 sends the information used for grant-free transmission unit configuration to the centrally configured network element. This step is optional, and the access device 2 may periodically or aperiodically send the information used for grant-free transmission unit configuration.

S204': The centrally configured network element receives the information that is used for grant-free transmission unit configuration and that is sent by the access device 2. This step is optional. Further, optionally, after receiving information, the access device 2 centrally configured network sends a feedback message about the received information to the access device 2 (not shown in the figure).

S205: The centrally configured network element configures grant-free transmission units of the access device 1 and the access device 2. Optionally, configuration may be performed according to the information reported by the access device 1 and the access device 2. Because one access device may have one or more grant-free transmission units, configuration information of the grant-free transmission unit of the access device is information about configuration of the one or more grant-free transmission units of the access device, and specifically, may include information about the one or more grant-free transmission units, or information about a control mechanism of the one or more grant-free transmission units. Explanations may be similar in other parts of the embodiments of this application. If the access device is a baseband unit set, because the baseband unit set may include one or more baseband units, configuration information of a grant-free transmission unit of the access device may be understood as configuration information of the grant-free transmission unit of the one or more baseband units included in the baseband unit set. In the embodiments of this application, in a scenario in which the access device is a baseband unit set, "of an access device" may be understood as "of one or more baseband units included in a baseband unit set", and details are not further described. Certainly, one baseband unit may have one or more grant-free transmission units. Therefore, configuration information of the grant-free transmission unit of the baseband unit is information about configuration of the one or more grant-free transmission units of the baseband unit, and specifically, may include information about the one or more grant-free transmission units, or information about a control mechanism of the one or more grant-free transmission units.

S206: The centrally configured network element sends configuration information of a grant-free transmission unit of the access device 1 to the access device 1, or may further send configuration information of a grant-free transmission unit of a neighboring access device of the access device 1. The configuration information of the grant-free transmission unit of the access device 1 and the configuration information of the grant-free transmission unit of the neighboring access device of the access device 1 may be sent in one message, or may be sent in different messages.

S206': The access device 1 receives the configuration information that is of the grant-free transmission unit of the access device 1 and that is sent by the centrally configured network element. Further, received information includes the configuration information of the grant-free transmission unit of the neighboring access device of the access device 1. Further, optionally, after receiving the configuration information of the grant-free transmission unit, the access device 1 sends a feedback message about the received configuration information of the grant-free transmission unit to the centrally configured network element (not shown in the figure).

S207: The centrally configured network element sends configuration information of a grant-free transmission unit of the access device 2 to the access device 2, or may further send configuration information of a grant-free transmission unit of a neighboring access device of the access device 2. The configuration information of the grant-free transmission unit of the access device 2 and the configuration information of the grant-free transmission unit of the neighboring access device of the access device 2 may be sent in one message, or may be sent in different messages.

S207': The access device 2 receives the configuration information that is of the grant-free transmission unit of the access device 2 and that is sent by the centrally configured network element. Further, received information includes the configuration information of the grant-free transmission unit of the neighboring access device of the access device 2. Further, optionally, after receiving the configuration information of the grant-free transmission unit, the access device 2 sends a feedback message about the received configuration information of the grant-free transmission unit to the centrally configured network element (not shown in the figure).

S208: The access device 1 sends the configuration information of the grant-free transmission unit of the access device 1 to a terminal device 1 within a coverage area of the access device 1. A terminal device within the coverage area of the access device 1 may also be understood as a terminal device within an area controlled by the access device 1, or within an area covered by a signal of the access device 1 or a signal of another device connected to the access device 1. Understandings may be similar in other parts of the embodiments of this application, and details are not further described.

S208': The terminal device 1 within the coverage area of the access device 1 receives the configuration information that is of the grant-free transmission unit of the access device 1 and that is sent by the access device 1. Further, optionally, after receiving the configuration information of the grant-free transmission unit, the terminal device 1 within the coverage area of the access device 1 sends a feedback message about the received configuration information of the grant-free transmission unit of the access device 1 to the access device 1 (not shown in the figure).

S209: The access device 2 sends the configuration information of the grant-free transmission unit of the access device 2 to a terminal device 2 within a coverage area of the access device 2.

S209': The terminal device 2 within the coverage area of the access device 2 receives the configuration information that is of the grant-free transmission unit of the access device 2 and that is sent by the access device 2. Further, optionally, after receiving the configuration information of the grant-free transmission unit, the terminal device 2 within the coverage area of the access device 2 sends a feedback message about the received configuration information of the grant-free transmission unit of the access device 2 to the access device 2 (not shown in the figure).

The following describes the method for obtaining configuration information of a grant-free transmission unit.

FIG. 2 actually includes the method for obtaining configuration information of a grant-free transmission unit, for example, S206, S206', S207, and S207'. The method for obtaining configuration information of a grant-free transmission unit may include the following steps:

A centrally configured network element sends configuration information of a grant-free transmission unit of one or more access devices to the one or more access devices, where the grant-free transmission unit refers to a transmission resource used for grant-free transmission, and may be a basic transmission resource used for grant-free transmission, and the configuration information of the grant-free transmission unit includes at least one or more of the following information: information about the grant-free transmission unit or information about a grant-free transmission unit control mechanism. Configuration information of a grant-free transmission unit of one access device may include configuration information of one or more grant-free transmission units or configuration information of one or more sets of grant-free transmission units.

The one or more access devices receive the configuration information that is of the grant-free transmission unit of the one or more access devices and that is sent by the centrally configured network element. Further, optionally, the one or more access devices send a response message about the received configuration information of the grant-free transmission unit to the centrally configured network element.

According to the method for obtaining configuration information in this embodiment of the present invention, a centrally configured network element sends configuration information of a grant-free transmission unit to an access device. In this way, the access device can obtain the configuration information of the grant-free transmission unit, so that a grant-free service of a terminal device within a coverage area of the access device can be smoothly carried out.

Figure 3:
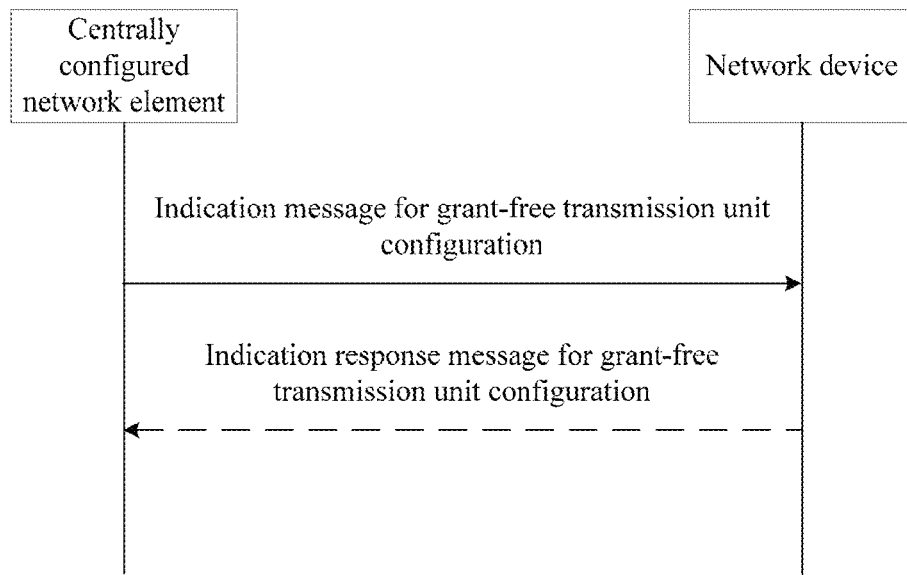
FIG. 3 is another schematic flowchart of a method for obtaining configuration information of a grant-free transmission unit according to an embodiment of the present invention.

For example, as shown in FIG. 3, the centrally configured network element may send the configuration information of the grant-free transmission unit of the one or more access devices to the one or more access devices by using an indication message for grant-free transmission unit configuration. FIG. 3 uses one access device as an example. The one or more access devices may send a response message (optional) about the received indication message for grant-free transmission unit configuration to the centrally configured network element by using an indication response message for grant-free transmission unit configuration. Certainly, the indication message for grant-free transmission unit configuration or the indication response message for grant-free transmission unit configuration may have another name, for example, may be carried in another existing message or a newly defined message.

An implementation example of the indication message for grant-free transmission unit configuration is as follows. English for grant-free transmission unit may be grant free transmission unit, GFTU for short. Certainly, another English description and English abbreviation may be used by a person skilled in the art. The grant-free transmission unit in other parts of the embodiments of this application is understood in a same manner, and details are not further described.

| IE/Group Name | Presence | Range | IE type and reference | Semantics description | Criticality | Assigned Criticality |
|---|---|---|---|---|---|---|
| Message Type | M | | | | YES | ignore |
| GFTU Configuration of Target eBN | M | | | | YES | reject |
| >Cell Configuration Item | M | 1 ... <maxCellineNB> | | | | |
| >>Cell ID | M | | | | | |
| >>GFTU Status | M | | 9.2.xx | | YES | ignore |
| GFTU Configuration of neighbouring eNB | O | | | | YES | ignore |
| >eNB Configuration Item | | 1 ... <maxNeighbouring eNB> | | | | |
| >>eNB ID | | | | | | |
| >>Cell Configuration Item | O | 1 ... <maxCellineNB> | | | YES | ignore |
| >>Cell ID | O | | | | YES | ignore |
| >>>GFTU Status | O | | 9.2.xx | | YES | ignore |

GFTU Status may be configuration information of one grant-free transmission unit. The foregoing table represents that there are configuration information of multiple grant-free transmission units for multiple cells. An implementation example of a format of this IE GFTU Status may be as follows:

9.2.xx GFTU Status

| IE/Group Name | Presence | Range | IE type and reference | Semantics description |
|---|---|---|---|---|
| CHOICE GFTU Information | M | | — | — |
| >GFTU Configuration | M | 1 ... maxGFTUinCell | | |
| >>FDD | | | — | — |
| >>>Time Domain Info | M | | BIT STRING (SIZE(T1)) | Each position in the bitmap represents a subframe, for which value "1" indicates GFTU is located in the corresponding subframe and value "0" indicates GFTU is located in the corresponding subframe. The first position of the Time Domain Info corresponds to subframe 0 in a radio frame where SFN = 0. The Time Domain Info is continuously repeated in all radio frames. The maximum number of subframes is T1. |
| >>>Frequency Domain Info | M | | BIT STRING (SIZE(F1)) | Each position in the bitmap represents an RB, for which value "1" indicates the corresponding RB is allocated to GFTU and value "0" indicates the corresponding RB is not allocated to GFTU. The first position of the Frequency Domain Info corresponds to the lowest indexed RB of the bandwidth. |
| >>TDD | | | — | — |
| >>>Time Domain Info | M | | BIT STRING (1 ... T2) | Each position in the bitmap represents a subframe, for which value "1" indicates GFTU is located in the corresponding subframe and value "0" indicates GFTU is located in the corresponding subframe. The first position of the Time |

| IE/Group Name | Presence | Range | IE type and reference | Semantics description |
|---|---|---|---|---|
| | | | | Domain Info corresponds to subframe 0 in a radio frame where SFN = 0. The Time Domain Info is continuously repeated in all radio frames. The maximum number of subframes is T2. |
| >>>Frequency Domain Info | M | | BIT STRING (SIZE(F2)) | Each position in the bitmap represents an RB, for which value "1" indicates the corresponding RB is allocated to GFTU and value "0" indicates the corresponding RB is not allocated to GFTU. The first position of the Frequency Domain Info corresponds to the lowest indexed RB of the bandwidth. |

Optionally, the centrally configured network element sends configuration information of a grant-free transmission unit of a neighboring access device of the one or more access devices to the one or more access devices, for example, IE information of GFTU Configuration of neighbouring eNB in the foregoing example. The configuration information of the grant-free transmission unit of the neighboring access device of the one or more access devices is sent to the one or more access devices, so that an access device that receives the configuration information of the grant-free transmission unit of the neighboring access device can configure a transmission resource of the access device (for example, configure a granted transmission resource) according to the configuration information of the grant-free transmission unit of the neighboring access device or use the obtained configuration information of the grant-free transmission unit of the neighboring access device for another purpose. For example, if the grant-free transmission unit of the neighboring access device overlaps with the granted transmission resource of the access device, the access device can make some adjustments, for example, power reduction, to its own granted transmission, to reduce impact on neighboring grant-free transmission.

Optionally, the centrally configured network element sends information about a grant-free area to which the one or more access devices belong to the one or more access devices. The grant-free area may be a set of one or more access devices, and the grant-free area may be used to physically represent a geographical area covered by an access device. Certainly, the information about the grant-free area may or may not be sent together with the configuration information of the grant-free transmission unit.

Figure 4:
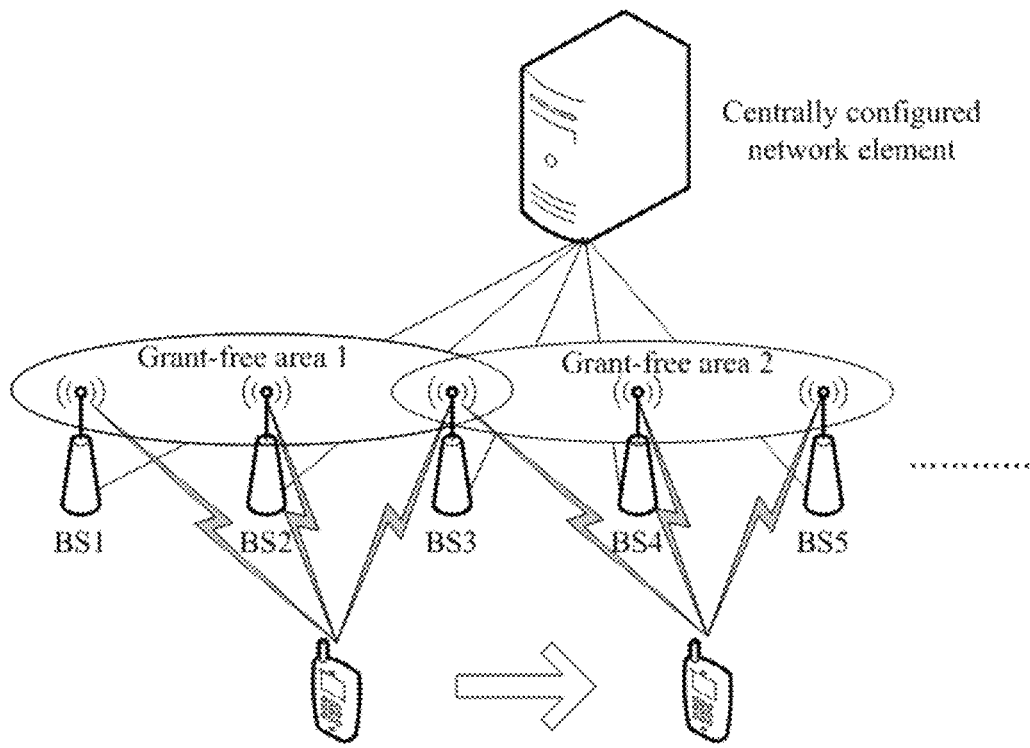
FIG. 4 is a schematic diagram of another application scenario according to an embodiment of the present invention.

Optionally, the centrally configured network element configures a grant-free transmission unit based on a grant-free area. For example, if access devices 1 to 3 belong to a same grant-free area 1, the grant-free area 1 has configuration information 1 of one grant-free transmission unit; if access devices 3 to 5 belong to a same grant-free area 2, the grant-free area 2 has configuration information 2 of one grant-free transmission unit. Therefore, because the access devices 1, 2, 4, and 5 each belong to only one grant-free area, configuration information of grant-free transmission units of the access devices 1, 2, 4, and 5 may be configuration information of grant-free transmission units of only grant-free area 1. Because the access device 3 belongs to two grant-free areas, configuration information of a grant-free transmission unit of the access device 3 may be configuration information of grant-free transmission units of the grant-free areas 1 and 2. As shown in FIG. 4, access devices (BSs are used as an example in FIG. 4) that belong to a same grant-free area can constitute a virtual service set, and the access devices in the virtual service set serve a terminal device jointly. For example, in FIG. 4, when the terminal device is in the grant-free area 1, a BS 1 to a BS 3 serve the terminal device; and when the terminal device moves to the grant-free area 2, a BS 3 to a BS 5 serve the terminal device.

Grant-free area information is sent, so that an access device that receives the grant-free area information can establish a virtual service set according to the grant-free area information, to serve a terminal device.

English for grant-free area may be GRANT FREE AREA CONFIGURATION, and may be GFA Configuration for short. Certainly, there may be another English description. An example of how a grant-free area is represented in an indication message for grant-free transmission unit configuration may be as follows. Certainly, the grant-free area information may also be carried in another message.

| IE/Group Name | Presence | Range | IE type and reference | Semantics description | Criticality | Assigned Criticality |
|---|---|---|---|---|---|---|
| Message Type | M | | | | YES | ignore |
| GFA Configuration | M | | | | YES | reject |
| >GFA Configuration Item IEs | M | 1 . . . <maxnoofGFA> | | | | |
| >>GFA ID | M | | | | | |
| >>GFTU Configuration List IEs | M | 1 . . . <maxnoofGFTA> | | | | |
| >>>GFTU Configuration | M | | XY | | YES | ignore | maxnoofGFA indicates a maximum quantity of GFAs when an access device belongs to multiple GFAs at the same time.

A further example of the IE grant-free transmission unit configuration information GFTU configuration may be as follows:

| IE/Group Name | Presence | Range | IE type and reference | Semantics description |
|---|---|---|---|---|
| GFTU Configuration IE | M | | — | — |
| >>FDD | | | — | — |
| >>>Time Domain Info | M | | BIT STRING (SIZE(T1)) | Each position in the bitmap represents a subframe, for which value "1" indicates GFTU is located in the corresponding subframe and value "0" indicates GFTU is located in the corresponding subframe. The first position of the Time Domain Info corresponds to subframe 0 in a radio frame where SFN = 0. The Time Domain Info is continuously repeated in all radio frames. The maximum number of subframes is T1. |
| >>>Frequency Domain Info | M | | BIT STRING (SIZE(F1)) | Each position in the bitmap represents an RB, for which value "1" indicates the corresponding RB is allocated to GFTU and value "0" indicates the corresponding RB is not allocated to GFTU. The first position of the Frequency Domain Info corresponds to the lowest indexed RB of the bandwidth. |
| >TDD | | | — | — |
| >>>Time Domain Info | M | | BIT STRING (1 . . . T2) | Each position in the bitmap represents a subframe, for which value "1" indicates GFTU is located in the corresponding subframe and value "0" indicates GFTU is located in the corresponding subframe. The first position of the Time Domain Info corresponds to subframe 0 in a radio frame where SFN = 0. The Time Domain Info is continuously repeated in all radio frames. The maximum number of subframes is T2. |

-continued

| IE/Group Name | Presence | Range | IE type and reference | Semantics description |
|---|---|---|---|---|
| >>>Frequency Domain Info | M | | BIT STRING (SIZE(F2)) | Each position in the bitmap represents an RB, for which value "1" indicates the corresponding RB is allocated to GFTU and value "0" indicates the corresponding RB is not allocated to GFTU. The first position of the Frequency Domain Info corresponds to the lowest indexed RB of the bandwidth. |

Optionally, the access device may belong to one grant-free area, or may belong to multiple grant-free areas. If the access device belongs to multiple grant-free areas, the configuration information of the grant-free transmission unit of the access device is configuration information of grant-free transmission units in the multiple grant-free areas to which the access device belongs.

Further, optionally, the one or more access devices may send the configuration information of the grant-free transmission unit of the one or more access devices to a terminal device in a coverage area of the one or more access devices. This has been described, for example, S208, S208', S209, and S209' in the foregoing embodiment.

The following describes the method for obtaining information used for grant-free transmission unit configuration.

The method for obtaining information used for grant-free transmission unit configuration may, as an independent technical solution, include steps such as S203, S203', S204, and S204', and optionally, may include steps S201, S201', S202, and S202'. A quantity of access devices may not be limited to 2. The method for obtaining information used for grant-free transmission unit configuration and a technical solution to another technical problem, for example, the method for configuring a grant-free transmission unit or the method for obtaining configuration information of a grant-free transmission unit, are combined into a new solution.

Optionally, the information that is sent by the access device 1 or 2 to the centrally configured network element in S203, S203', S204, and S204' is information used for grant-free transmission unit configuration, and may include but is not limited to one or more of the following information: load information of the one or more access devices (for example, the access device 1 or the access device 2), capability information of a terminal device served by the one or more access devices (for example, the access device 1 or the access device 2), or a grant-free transmission requirement of the one or more access devices (for example, the access device 1 or the access device 2); and may be sent in INFORMATION REPORT.

An implementation example of INFORMATION REPORT is as follows:

| IE/Group Name | Presence | Range | IE type and reference | Semantics description | Criticality | Assigned Criticality |
|---|---|---|---|---|---|---|
| Message Type | M | | 9.2.13 | | YES | ignore |
| Cell Information | M | | | | YES | ignore |
| >Cell Information Item | | 1 ... <maxCellineNB> | | | EACH | ignore |
| >>Cell ID | M | | | Id of the source cell | — | — |
| >>UL Load Indication | O | | xx | | — | — |
| >>UE Capability | O | | yy | | | |
| >>GF Requirement | O | | zz | | | | xx represents load information that is of an access device and that needs to be reported, and an example of its format may be as follows:

This IE provides a report on UL load information.

| IE/Group Name | Presence | Range | IE type and reference | Semantics description |
|---|---|---|---|---|
| UL Load Indication | O | | ENUMERATED (high load, medium load, low load, ... ) | | yy represents capability information that is of a terminal device served by an access device and that needs to be reported, and an example of its format may be as follows:

This IE provides a report on UE capability information.

| IE/Group Name | Presence | Range | IE type and reference | Semantics description |
|---|---|---|---|---|
| UE Capability | O | | ENUMERATED (support GF, not support GF, ... ) | | zz represents a grant-free transmission requirement that is of an access device and that needs to be reported, and an This IE provides a report on GF requirement information.

| IE/Group Name | Presence | Range | IE type and reference | Semantics description |
|---|---|---|---|---|
| GF Requirement | O | | ENUMERATED (high, medium, low, . . . ) | |

The following describes the method for configuring a grant-free transmission unit.

The method for configuring a grant-free transmission unit, as an independent technical solution, may include a step such as S205. A quantity of access devices may not be limited to 2. The method for configuring a grant-free transmission unit and a technical solution to another technical problem, for example, the method for obtaining information used for grant-free transmission unit configuration or the method for obtaining configuration information of a grant-free transmission unit, are combined into a new solution.

Figure 5A:
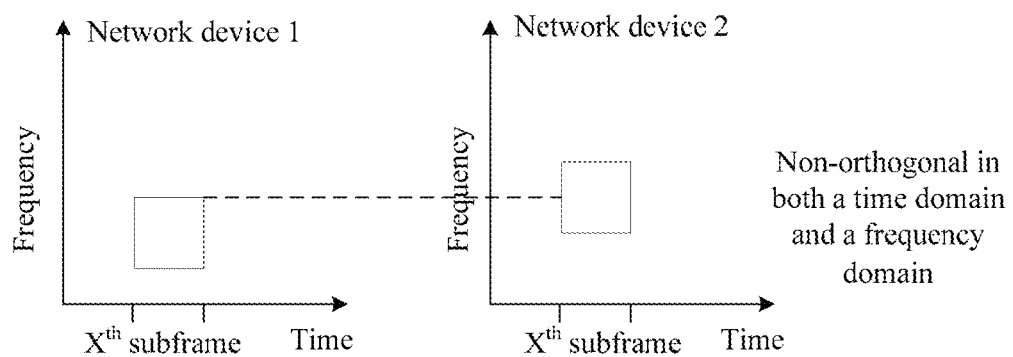
FIG. 5A and FIG. 5B are respectively schematic principle diagrams of resource orthogonality according to an embodiment of the present invention.
Figure 5B:
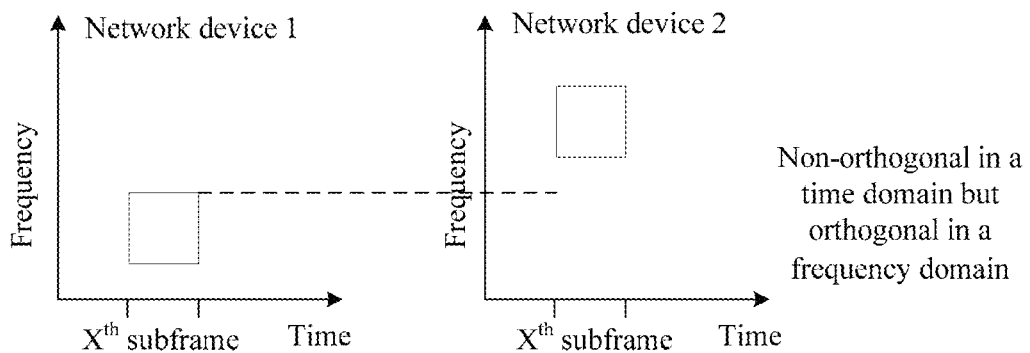

A configuration manner in which the centrally configured network element configures the grant-free transmission unit of the access device may include but is not limited to one or more of the following:

The centrally configured network element configures the grant-free transmission unit of the access device, so that the grant-free transmission unit of the access device is orthogonal to a grant-free transmission unit of another access device (there may be one or more access devices). Being orthogonal to a grant-free transmission unit may mean being orthogonal to the grant-free transmission unit in any one or more dimensions of transmission resources, such as a time domain, or a frequency domain, or a space domain, or a time domain and a frequency domain, or a time domain and a space domain, or a space domain and a frequency domain, or a time domain, a frequency domain, and a space domain. Being orthogonal may be understood as non-overlapping. FIG. 5A and FIG. 5B are used as an example. FIG. 5A shows that grant-free transmission units of a network device 1 (one network device is uses as an example herein) and a network device 2 overlap in a time domain and a frequency domain, which may be understood as non-orthogonal. FIG. 5B shows that, although non-orthogonal in a time domain, a grant-free transmission unit of a network device 2 is orthogonal to a grant-free transmission unit of a network device 1 in a frequency domain.

The centrally configured network element configures uplink power of the grant-free transmission unit of the access device. For specific configuration, refer to a manner in which the access device 2 configures uplink power of a grant-free transmission unit in the foregoing distributed mechanism.

The centrally configured network element configures a retransmission mechanism of the grant-free transmission unit of the access device, determines an access device whose grant-free transmission unit requires a retransmission mechanism and an access device whose grant-free transmission unit does not require a retransmission mechanism, and even may specifically configure different types of retransmission mechanisms.

The centrally configured network element configures a modulation and coding scheme of the grant-free transmission unit of the access device, and configures different, identical, or partly identical modulation and coding schemes for grant-free transmission units of the access device.

The centrally configured network element may perform the configuration according to an obtained grant-free transmission unit requirement of the access device. If the grant-free transmission unit requirement of the access device is lower than a specific threshold, the grant-free transmission unit of the access device may not be configured.

The centrally configured network element may perform the configuration according to obtained capabilities of a terminal device served by the access device. If none of the capabilities of the terminal device served by the access device support a grant-free transmission unit, the grant-free transmission unit of the access device may not be configured. If some or all capabilities of the terminal device served by the access device support a grant-free transmission unit, the grant-free transmission unit of the access device may be configured.

Although descriptions of the foregoing embodiments relate to multiple network devices (for example, the centrally configured network element and the access device) or terminal devices, protection and implementation of the technical solutions of the patent may be merely for a single network device.

Figure 6:
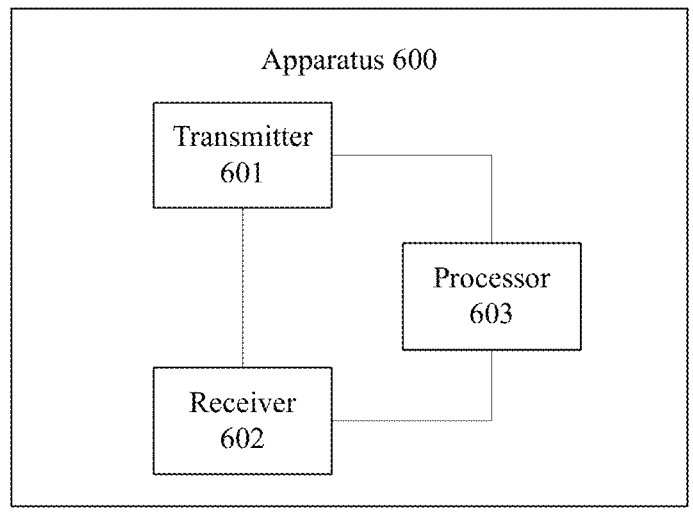
FIG. 6 is a schematic block diagram of an apparatus for obtaining configuration information of a grant-free transmission unit according to an embodiment of the present invention.
Figure 7:
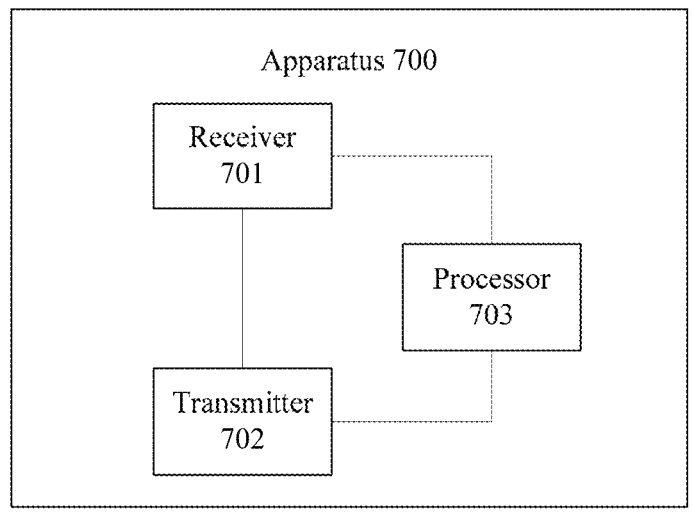
FIG. 7 is another schematic block diagram of an apparatus for obtaining configuration information of a grant-free transmission unit according to an embodiment of the present invention.

With reference to FIG. 1 to FIG. 5B, the foregoing describes in detail the method for obtaining configuration information of a grant-free transmission unit according to the embodiments of the present invention. With reference to FIG. 6 and FIG. 7, the following describes in detail an apparatus for obtaining configuration information of a grant-free transmission unit according to the embodiments of the present invention.

FIG. 6 describes an apparatus for obtaining configuration information of a grant-free transmission unit. As shown in FIG. 6, the apparatus 600 includes a sending unit.

Optionally, the sending unit may be a transmitter 601, or the sending unit may be a transmitter circuit.

Further, optionally, the apparatus 600 includes a receiving unit. Optionally, the receiving unit may be a receiver 602, or the receiving unit may be a receiver circuit. The sending unit is connected to the receiving unit.

Further, optionally, the apparatus 600 includes a processing unit. Optionally, the processing unit may be a processor 603, or the processing unit may be a processing circuit. Both the sending unit and the receiving unit are connected to the processing unit.

Optionally, the sending unit and the receiving unit may be integrated to form a transceiver unit, or the transmitter and the receiver may be integrated to form a transceiver, or the transmitter circuit and the receiver circuit may be integrated to form a transceiver circuit.

Optionally, any two or more of the transmitter circuit, the receiver circuit, or the processing circuit may be integrated into one integrated circuit.

The following uses the receiver, the transmitter, and the processor as an example for description.

The transmitter 601 is configured to:

send configuration information of a grant-free transmission unit of an access device to the access device, where the grant-free transmission unit refers to a transmission resource used for grant-free transmission, and the configuration information of the grant-free transmission unit includes at least one or more of the following information: information about the grant-free transmission unit or information about a grant-free transmission unit control mechanism.

The information about the grant-free transmission unit is one or more of the following information:

time-domain resource information, frequency-domain resource information, space-domain resource information, code-domain resource information, or pilot resource information.

The information about the grant-free transmission control mechanism is one or more of the following information:

uplink power control information, modulation and coding scheme information, or retransmission mechanism information.

Optionally, the apparatus further includes the transmitter 601, further configured to send configuration information of a grant-free transmission unit of a neighboring access device of the access device to the access device.

Optionally, the receiver 601 is further configured to send information about a grant-free area to which the access device belongs to the access device.

Optionally, the receiver 602 is configured to receive the information that is used for grant-free transmission unit configuration and that is sent by the access device.

Optionally, the information used for grant-free transmission unit configuration includes one or more of the following information:

load information of the access device, capability information of a terminal device served by the access device, or a grant-free transmission requirement of the access device.

Optionally, the transmitter 601 is further configured to send an information reporting request message to the access device, where the information reporting request message is used to request the access device to send the information used for grant-free transmission unit configuration.

Optionally, the apparatus further includes the processor 603. The processor 603 is further configured to configure the grant-free transmission unit of the access device.

Optionally, the processor is further configured to configure the grant-free transmission unit of the access device in one or a combination of the following manners:

configuring the grant-free transmission unit of the access device, so that the grant-free transmission unit of the access device is orthogonal to a grant-free transmission unit of another access device;

configuring uplink power of the grant-free transmission unit of the access device;

configuring a retransmission mechanism of the grant-free transmission unit of the access device; and configuring a modulation and coding scheme of the grant-free transmission unit of the access device.

It should be understood that, the apparatus 600 for obtaining configuration information of a grant-free transmission unit according to this embodiment of the present invention may be corresponding to the centrally configured network element in the method embodiments of the present invention, and the foregoing and other operations and/or functions of the components in the apparatus 600 are to implement corresponding procedures of the methods in FIG. 1 to FIG. 5B. For brevity, the descriptions of the foregoing embodiments of the present invention may be applicable to the apparatus embodiment, and details are not described herein again.

As shown in FIG. 7, an embodiment of the present invention further provides an apparatus 700 for obtaining configuration information of a grant-free transmission unit. The apparatus 700 includes a receiving unit.

Optionally, the receiving unit may be a receiver 701, or the receiving unit may be a receiver circuit.

Further, optionally, the apparatus 700 includes a sending unit. Optionally, the sending unit may be a transmitter 702, or the sending unit may be a transmitter circuit. The sending unit is connected to the receiving unit.

Optionally, the apparatus 700 includes a processing unit. Optionally, the processing unit may be a processor 703, or the processing unit may be a processing circuit. Both the sending unit and the receiving unit are connected to the processing unit.

Optionally, the sending unit and the receiving unit may be integrated to form a transceiver unit, or the transmitter and the receiver may be integrated to form a transceiver, or the transmitter circuit and the receiver circuit may be integrated to form a transceiver circuit.

Optionally, any two or more of the transmitter circuit, the receiver circuit, or the processing circuit may be integrated into one integrated circuit.

The following uses the receiver, the transmitter, and the processor as an example for description.

The receiver 701 is configured to:

receive configuration information of a grant-free transmission unit of the apparatus, and optionally, receive configuration information that is of a grant-free transmission unit of the apparatus and that is sent by a centrally configured network element, where the grant-free transmission unit refers to a transmission resource used for grant-free transmission, and the configuration information of the grant-free transmission unit includes at least one or more of the following information: information about the grant-free transmission unit or information about a grant-free transmission unit control mechanism.

The information about the grant-free transmission unit is one or more of the following information:

time-domain resource information, frequency-domain resource information, space-domain resource information, code-domain resource information, or pilot resource information.

The information about the grant-free transmission control mechanism is one or more of the following information:

uplink power control information, modulation and coding scheme information, or retransmission mechanism information.

Optionally, the receiver 701 is further configured to receive configuration information of a grant-free transmission unit of a neighboring access device of the apparatus.

Optionally, the receiver 701 is further configured to receive information about a grant-free area to which the apparatus belongs.

Optionally, the transmitter 702 is further configured to send information used for grant-free transmission unit configuration to the centrally configured network element.

Optionally, the information used for grant-free transmission unit configuration includes one or more of the following information: load information of the apparatus, capability information of a terminal device served by the apparatus, or a grant-free transmission requirement of the apparatus.

Optionally, the receiver 701 is further configured to receive an information reporting request message, where the information reporting request message is used to request the apparatus to send the information used for grant-free transmission unit configuration. Optionally, the receiver 701 receives the information reporting request message that is sent by the centrally configured network element.

Optionally, the processing unit, for example, the processor 703, is configured to: control the sending unit, for example, the transmitter 702, to send a signal, and control the receiving unit, for example, the receiver 701, to receive a signal.

It should be understood that, the apparatus 700 for obtaining configuration information of a grant-free transmission unit according to this embodiment of the present invention may be corresponding to the access device in the embodiments of the present invention, and the foregoing and other operations and/or functions of the components in the apparatus 700 are to implement corresponding procedures of the methods in FIG. 2 to FIG. 5B. For brevity, the descriptions of the foregoing embodiments of the present invention may be applicable to the apparatus embodiment, and details are not described herein again.

An embodiment of the present invention further relates to a system for obtaining configuration information of a grant-free transmission unit, including the centrally configured network element and the access device in the foregoing method embodiments. For specific division of structures and functions of the centrally configured network element and the access device, refer to the apparatuses 600 and 700 for obtaining configuration information of a grant-free transmission unit. Descriptions of the foregoing method embodiments and apparatus embodiments may be applicable to the system embodiment, and details are not described herein again.

It should be understood that, in the foregoing embodiments of the present invention, the processor may be a central processing unit (Central Processing Unit, "CPU" for short), or may be another general purpose processor, a digital signal processor (DSP), an application-specific integrated circuit (ASIC), a field programmable gate array (FPGA) or another programmable logic device, a discrete gate or a transistor logic device, or a discrete hardware component. The general purpose processor may be a microprocessor, or the processor may be any conventional processor.

A memory may include a read-only memory and a random access memory, and provide instructions and data to the processor. A part of the memory may further include a non-volatile random access memory. For example, the memory may further store device type information.

In addition to a data bus, a bus system may further include a power bus, a control bus, a status signal bus, and so on. However, for clear description, all buses in the figure are marked as the bus system.

In an implementation process, steps in the foregoing method may be implemented by using a hardware integrated logic circuit in the processor, or by using instructions in a form of software. The steps of the method disclosed in this embodiment of the present invention may be directly implemented by a hardware processor, or may be implemented by a combination of hardware and software modules in the processor. The software module may be located in a storage medium that is mature in the art, such as a random access memory, a flash memory, a read-only memory, a programmable read-only memory or an erasable programmable memory, or a register. The storage medium is located in the memory, and the processor reads information in the memory and completes the steps in the foregoing method in combination with hardware of the processor. To avoid repetition, no detailed description is given herein again.

It should be understood that, the sending module, the sending unit, or the transmitter in the foregoing embodiments of the present invention may send information directly over an air interface, or may send information to another device, instead of sending information directly over an air interface, so that the another device sends information over the air interface. Similarly, the receiving module, the receiving unit, or the receiver in the foregoing embodiments may receive information directly over an air interface, or may receive information over an air interface by using another device, instead of receiving information directly over the air interface.

It should further be understood that, to make the application document brief and clear, technical features and descriptions in one of the foregoing embodiments may be applicable to other embodiments. For example, technical features of a method embodiment may be applicable to apparatus embodiments or other method embodiments, and details are not further described in the other embodiments.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in the embodiments of the present invention, "B corresponding to A" indicates that B is associated with A, and B may be determined according to A. However, it should further be understood that determining A according to B does not mean that B is determined according to A only; that is, B may also be determined according to A and/or other information.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present invention.

In addition, functional units in the embodiments of the present invention may be integrated into one unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific embodiments of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

Further embodiments of the present invention are provided in the following. It should be noted that the numbering used in the following section does not necessarily need to comply with the numbering used in the previous sections. The numbering of following embodiments may not be consecutive.

Embodiment 1

A method for obtaining configuration information of a grant-free transmission unit, comprising:

sending, by a centrally configured network element, configuration information of a grant-free transmission unit of an access device to the access device, wherein the grant-free transmission unit refers to a transmission resource used for grant-free transmission, and the configuration information of the grant-free transmission unit comprises at least one or more of the following information: information about the grant-free transmission unit or information about a grant-free transmission control mechanism; and receiving, by the access device, the configuration information that is of the grant-free transmission unit of the access device and that is sent by the centrally configured network element, wherein the information about the grant-free transmission unit is one or more of the following information:

time-domain resource information, frequency-domain resource information, space-domain resource information, code-domain resource information, or pilot resource information; and the information about the grant-free transmission control mechanism is one or more of the following information: uplink power control information, modulation and coding scheme information, or retransmission mechanism information.

Embodiment 2

The method according to embodiment 1, further comprising:

sending, by the centrally configured network element, configuration information of a grant-free transmission unit of a neighboring access device of the access device to the access device.

Embodiment 3

The method according to embodiment 1 or 2, further comprising:

sending, by the centrally configured network element, information about a grant-free area to which the access device belongs to the access device, wherein the grant-free area is a set of one or more access devices, and the configuration information of the grant-free transmission unit of the access device is configuration information of a grant-free transmission unit in the grant-free area to which the access device belongs.

Embodiment 4

The method according to any one of embodiments 1 to 3, further comprising:

sending, by the access device, information used for grant-free transmission unit configuration to the centrally configured network element.

Embodiment 5

The method according to embodiment 4, wherein the information used for grant-free transmission unit configuration comprises one or more of the following information:

load information of the access device, capability information of a terminal device served by the access device, or a grant-free transmission requirement of the access device.

Embodiment 6

The method according to embodiment 4, before the sending, by the access device, information used for grant-free transmission unit configuration to the centrally configured network element, further comprising:

sending, by the centrally configured network element, an information reporting request message to the access device, wherein the information reporting request message is used to request the access device to send the information used for grant-free transmission unit configuration.

Embodiment 7

The method according to any one of embodiments 1 to 6, wherein the centrally configured network element configures the grant-free transmission unit of the access device.

Embodiment 8

The method according to embodiment 7, wherein the centrally configured network element configures the grant-free transmission unit of the access device in one or a combination of the following manners:

the centrally configured network element configures the grant-free transmission unit of the access device, so that the grant-free transmission unit of the access device is orthogonal to a grant-free transmission unit of another access device;

the centrally configured network element configures uplink power of the grant-free transmission unit of the access device;

the centrally configured network element configures a retransmission mechanism of the grant-free transmission unit of the access device; or the centrally configured network element configures a modulation and coding scheme of the grant-free transmission unit of the access device.

Embodiment 9

The method according to any one of embodiments 1 to 8, wherein the grant-free transmission is one or more of the following:

the grant-free transmission means that: an access device pre-allocates multiple transmission resources and notifies a terminal device of the multiple transmission resources; when there is an uplink data transmission requirement, the terminal device selects at least one transmission resource from the multiple transmission resources pre-allocated by the access device, and uses the selected transmission resource to send uplink data; and the access device detects, on one or more transmission resources of the multiple pre-allocated transmission resources, the uplink data sent by the terminal device;

the grant-free transmission means that: an access device pre-allocates multiple transmission resources and notifies a terminal device of the multiple transmission resources, so that when there is an uplink data transmission requirement, the terminal device selects at least one transmission resource from the multiple transmission resources pre-allocated by the access device, and uses the selected transmission resource to send uplink data;

the grant-free transmission means that: information about multiple pre-allocated transmission resources is obtained; and when there is an uplink data transmission requirement, at least one transmission resource is selected from the multiple transmission resources, and the selected transmission resource is used to send uplink data;

the grant-free transmission means a method by using which uplink data transmission of a terminal device can be implemented without dynamic scheduling performed by an access device, wherein the dynamic scheduling is a scheduling manner in which the access device indicates, by using signaling, a transmission resource for each uplink data transmission of the terminal device;

the grant-free transmission means that: a terminal device performs uplink data transmission without a grant from an access device, wherein the grant means that: the terminal device sends an uplink scheduling request to the access device, and after receiving the scheduling request, the access device sends an uplink grant to the terminal device, wherein the uplink grant is used to indicate an uplink transmission resource allocated to the terminal device; or the grant-free transmission means a contention-based transmission manner in which multiple terminals simultaneously perform uplink data transmission on a same pre-allocated time-frequency resource without a grant from a base station.

Embodiment 10

The method according to any one of embodiments 1 to 9, wherein the centrally configured network element is a mobility management entity MME, a serving gateway S-GW, or a packet data network gateway PDN-GW.

Embodiment 11

The method according to any one of embodiments 1 to 10, wherein the access device is a base station controller, a base station, or a baseband unit BBU set.

Embodiment 12

The method according to any one of embodiments 1 to 11, wherein the method is applied to one or more of the following networks: a public land mobile PLMN network, a D2D communications network, an M2M communications network, or a machine type communication MTC network.

Embodiment 13

A method for obtaining configuration information of a grant-free transmission unit, comprising:

receiving, by an access device, configuration information of a grant-free transmission unit of the access device, wherein the grant-free transmission unit refers to a transmission resource used for grant-free transmission, and the configuration information of the grant-free transmission unit comprises at least one or more of the following information: information about the grant-free transmission unit or information about a grant-free transmission control mechanism, wherein the information about the grant-free transmission unit is one or more of the following information:

time-domain resource information, frequency-domain resource information, space-domain resource information, code-domain resource information, or pilot resource information; and the information about the grant-free transmission control mechanism is one or more of the following information:

uplink power control information, modulation and coding scheme information, or retransmission mechanism information.

Embodiment 14

The method according to embodiment 13, further comprising:

receiving, by the access device, configuration information about a grant-free transmission unit of a neighboring access device of the access device.

Embodiment 15

The method according to embodiment 13 or 14, further comprising:

receiving, by the access device, information about a grant-free area to which the access device belongs, wherein the grant-free area is a set of one or more access devices, and the configuration information of the grant-free transmission unit of the access device is configuration information of a grant-free transmission unit in the grant-free area to which the access device belongs.

Embodiment 16

The method according to any one of embodiments 13 to 15, further comprising:
sending, by the access device, information used for grant-free transmission unit configuration.

Embodiment 17

The method according to embodiment 16, wherein the information used for grant-free transmission unit configuration comprises one or more of the following information:
load information of the access device, capability information of a terminal device served by the access device, or a grant-free transmission requirement of the access device.

Embodiment 18

The method according to embodiment 16 or 17, before the sending, by the access device, information used for grant-free transmission unit configuration, further comprising:
receiving, by the access device, an information reporting request message, wherein the information reporting request message is used to request the access device to send the information used for grant-free transmission unit configuration.

Embodiment 19

A method for obtaining configuration information of a grant-free transmission unit, comprising:
sending, by a centrally configured network element, configuration information of a grant-free transmission unit of an access device to the access device, wherein the grant-free transmission unit refers to a transmission resource used for grant-free transmission, and the configuration information of the grant-free transmission unit comprises at least one or more of the following information: information about the grant-free transmission unit or information about a grant-free transmission control mechanism; and
the information about the grant-free transmission unit is one or more of the following information:
time-domain resource information, frequency-domain resource information, space-domain resource information, code-domain resource information, or pilot resource information; and
the information about the grant-free transmission control mechanism is one or more of the following information:
uplink power control information, modulation and coding scheme information, or retransmission mechanism information.

Embodiment 20

The method according to embodiment 19, further comprising:
sending, by the centrally configured network element, configuration information of a grant-free transmission unit of a neighboring access device of the access device to the access device.

Embodiment 21

The method according to embodiment 19 or 20, further comprising:
sending, by the centrally configured network element, information about a grant-free area to which the access device belongs to the access device, wherein the grant-free area is a set of one or more access devices, and the configuration information of the grant-free transmission unit of the access device is configuration information of a grant-free transmission unit in the grant-free area to which the access device belongs.

Embodiment 22

The method according to any one of embodiments 19 to 21, further comprising:
receiving, by the centrally configured network element, information that is used for grant-free transmission unit configuration and that is sent by the access device.

Embodiment 23

The method according to embodiment 22, wherein the information used for grant-free transmission unit configuration comprises one or more of the following information:
load information of the access device, capability information of a terminal device served by the access device, or a grant-free transmission requirement of the access device.

Embodiment 24

The method according to any one of embodiments 19 to 23, further comprising:
sending, by the centrally configured network element, an information reporting request message to the access device, wherein the information reporting request message is used to request the access device to send the information used for grant-free transmission unit configuration.

Embodiment 25

The method according to any one of embodiments 19 to 24, wherein
the centrally configured network element configures the grant-free transmission unit of the access device.

Embodiment 26

The method according to embodiment 25, wherein the centrally configured network element configures the grant-free transmission unit of the access device in one or a combination of the following manners:
the centrally configured network element configures the grant-free transmission unit of the access device, so that the grant-free transmission unit of the access device is orthogonal to a grant-free transmission unit of another access device;
the centrally configured network element configures uplink power of the grant-free transmission unit of the access device;
the centrally configured network element configures a retransmission mechanism of the grant-free transmission unit of the access device; or
the centrally configured network element configures a modulation and coding scheme of the grant-free transmission unit of the access device.

Embodiment 27

An apparatus for obtaining configuration information of a grant-free transmission unit, wherein the apparatus comprises a transmitter, and the transmitter is configured to:

send configuration information of a grant-free transmission unit of an access device to the access device, wherein the grant-free transmission unit refers to a transmission resource used for grant-free transmission, and the configuration information of the grant-free transmission unit comprises at least one or more of the following information: information about the grant-free transmission unit or information about a grant-free transmission control mechanism, wherein the information about the grant-free transmission unit is one or more of the following information:

time-domain resource information, frequency-domain resource information, space-domain resource information, code-domain resource information, or pilot resource information; and the information about the grant-free transmission control mechanism is one or more of the following information:

uplink power control information, modulation and coding scheme information, or retransmission mechanism information.

Embodiment 28

The apparatus according to embodiment 27, wherein the transmitter is further configured to send configuration information of a grant-free transmission unit of a neighboring access device of the access device to the access device.

Embodiment 29

The apparatus according to embodiment 27 or 28, wherein the transmitter is further configured to send information about a grant-free area to which the access device belongs to the access device.

Embodiment 30

The apparatus according to any one of embodiments 27 to 29, further comprising: a receiver, wherein the receiver is configured to receive the information that is used for grant-free transmission unit configuration and that is sent by the access device.

Embodiment 31

The apparatus according to embodiment 30, wherein the information used for grant-free transmission unit configuration comprises one or more of the following information:

load information of the access device, capability information of a terminal device served by the access device, or a grant-free transmission requirement of the access device.

Embodiment 32

The apparatus according to any one of embodiments 27 to 31, wherein the transmitter is further configured to send an information reporting request message to the access device, wherein the information reporting request message is used to request the access device to send the information used for grant-free transmission unit configuration.

Embodiment 33

The apparatus according to any one of embodiments 27 to 32, further comprising: a processor, wherein the processor is further configured to configure the grant-free transmission unit of the access device.

Embodiment 34

The apparatus according to embodiment 33, wherein the processor is further configured to configure the grant-free transmission unit of the access device in one or a combination of the following manners:

configuring the grant-free transmission unit of the access device, so that the grant-free transmission unit of the access device is orthogonal to a grant-free transmission unit of another access device;

configuring uplink power of the grant-free transmission unit of the access device;

configuring a retransmission mechanism of the grant-free transmission unit of the access device; and configuring a modulation and coding scheme of the grant-free transmission unit of the access device.

Embodiment 35

An apparatus for obtaining configuration information of a grant-free transmission unit, wherein the apparatus comprises a receiver, and the receiver is configured to:

receive configuration information of a grant-free transmission unit of the apparatus, wherein the grant-free transmission unit refers to a transmission resource used for grant-free transmission, and the configuration information of the grant-free transmission unit comprises at least one or more of the following information: information about the grant-free transmission unit or information about a grant-free transmission control mechanism, wherein the information about the grant-free transmission unit is one or more of the following information:

time-domain resource information, frequency-domain resource information, space-domain resource information, code-domain resource information, or pilot resource information; and the information about the grant-free transmission control mechanism is one or more of the following information:

uplink power control information, modulation and coding scheme information, or retransmission mechanism information.

Embodiment 36

The apparatus according to embodiment 35, wherein the receiver is further configured to receive configuration information of a grant-free transmission unit of a neighboring access device of the apparatus.

Embodiment 37

The apparatus according to embodiment 35 or 36, wherein the receiver is further configured to receive information about a grant-free area to which the apparatus belongs.

Embodiment 38

The apparatus according to any one of embodiments 35 to 37, further comprising: a transmitter, configured to send information used for grant-free transmission unit configuration to a centrally configured network element.

Embodiment 39

The apparatus according to embodiment 38, wherein the information used for grant-free transmission unit configuration comprises one or more of the following information:
load information of the apparatus, capability information of a terminal device served by the apparatus, or a grant-free transmission requirement of the apparatus.

Embodiment 40

The apparatus according to any one of embodiments 35 to 39, wherein the receiver is further configured to receive an information reporting request message, wherein the information reporting request message is used to request the apparatus to send the information used for grant-free transmission unit configuration.

Embodiment 41

A system for obtaining configuration information of a grant-free transmission unit, comprising the apparatus according to any one of embodiments 27 to 34 and the apparatus according to any one of embodiments 35 to 40.

What is claimed is:

1. A method for obtaining configuration information of a grant-free transmission unit, comprising:
   receiving, by an access device, configuration information of a grant-free transmission unit of the access device, wherein the grant-free transmission unit refers to a transmission resource for grant-free transmission, and the configuration information of the grant-free transmission unit comprises at least one or more of the following information: information about the grant-free transmission unit or information about a grant-free transmission control mechanism, wherein
      the information about the grant-free transmission unit is one or more of the following information:
         time-domain resource information, frequency-domain resource information, space-domain resource information, code-domain resource information, or pilot resource information; and
      the information about the grant-free transmission control mechanism is one or more of the following information:
         uplink power control information, modulation and coding scheme information, or retransmission mechanism information;
   receiving, by the access device, information about a grant-free area to which the access device belongs, wherein the grant-free area is a set of one or more access devices, and the configuration information of the grant-free transmission unit of the access device is configuration information of a grant-free transmission unit in the grant-free area to which the access device belongs;
   sending, by the access device, the configuration information of the grant-free transmission unit to one or more terminal devices in a coverage area of the access device; and
   receiving, by the access device from the one or more terminal devices, data transmitted based on the configuration information of the grant-free transmission unit.

2. The method according to claim 1, further comprising:
   receiving, by the access device, configuration information about a grant-free transmission unit of a neighboring access device of the access device.

3. The method according to claim 1, further comprising:
   sending, by the access device, information used for grant-free transmission unit configuration.

4. The method according to claim 3, wherein the information used for grant-free transmission unit configuration comprises one or more of the following information:
   load information of the access device, capability information of a terminal device served by the access device, or a grant-free transmission requirement of the access device.

5. The method according to claim 3, before the sending, by the access device, information used for grant-free transmission unit configuration, further comprising:
   receiving, by the access device, an information reporting request message, wherein the information reporting request message is used to request the access device to send the information used for grant-free transmission unit configuration.

6. An apparatus for obtaining configuration information of a grant-free transmission unit, wherein the apparatus comprises a transmitter, and the transmitter is configured to:
   send configuration information of a grant-free transmission unit of an access device to the access device, wherein the configuration information of the grant-free transmission unit of the access device is usable to configure terminal devices in a coverage area of the access device to perform grant-free transmission, wherein the grant-free transmission unit refers to a transmission resource used for grant-free transmission, and the configuration information of the grant-free transmission unit comprises at least one or more of the following information: information about the grant-free transmission unit or information about a grant-free transmission control mechanism, wherein
      the information about the grant-free transmission unit is one or more of the following information:
         time-domain resource information, frequency-domain resource information, space-domain resource information, code-domain resource information, or pilot resource information; and
      the information about the grant-free transmission control mechanism is one or more of the following information:
         uplink power control information, modulation and coding scheme information, or retransmission mechanism information; and
   send, to the access device, information about a grant-free area to which the access device belongs to the access device, wherein the grant-free area is a set of one or more access devices, and the configuration information of the grant-free transmission unit of the access device is configuration information of a grant-free transmission unit in the grant-free area to which the access device belongs.

7. The apparatus according to claim 6, wherein the transmitter is further configured to send configuration information of a grant-free transmission unit of a neighboring access device of the access device to the access device.

8. The apparatus according to claim 6, further comprising: a receiver, wherein the receiver is configured to receive the information that is used for grant-free transmission unit configuration and that is sent by the access device.

9. The apparatus according to claim 8, wherein the information used for grant-free transmission unit configuration comprises one or more of the following information:
load information of the access device, capability information of a terminal device served by the access device, or a grant-free transmission requirement of the access device.

10. The apparatus according to claim 6, wherein the transmitter is further configured to send an information reporting request message to the access device, wherein the information reporting request message is used to request the access device to send the information used for grant-free transmission unit configuration.

11. An apparatus for obtaining configuration information of a grant-free transmission unit, wherein the apparatus comprises a receiver, and the receiver is configured to:
receive configuration information of a grant-free transmission unit of the apparatus, wherein the grant-free transmission unit refers to a transmission resource used for grant-free transmission, and the configuration information of the grant-free transmission unit comprises at least one or more of the following information: information about the grant-free transmission unit or information about a grant-free transmission control mechanism, wherein
the information about the grant-free transmission unit is one or more of the following information:
time-domain resource information, frequency-domain resource information, space-domain resource information, code-domain resource information, or pilot resource information; and
the information about the grant-free transmission control mechanism is one or more of the following information:
uplink power control information, modulation and coding scheme information, or retransmission mechanism information;
receive information about a grant-free area to which the apparatus belongs, wherein the grant-free area is a set of one or more access devices, and the configuration information of the grant-free transmission unit is configuration information of a grant-free transmission unit in the grant-free area to which the apparatus belongs;
send the configuration information of the grant-free transmission unit to one or more terminal devices in a coverage area of the access device; and
receive, from the one or more terminal devices, data transmitted based on the configuration information of the grant-free transmission unit.

12. The apparatus according to claim 11, wherein the receiver is further configured to receive configuration information of a grant-free transmission unit of a neighboring access device of the apparatus.

13. The apparatus according to claim 11, further comprising: a transmitter, configured to send information used for grant-free transmission unit configuration to a centrally configured network element.

14. The apparatus according to claim 13, wherein the information used for grant-free transmission unit configuration comprises one or more of the following information:
load information of the apparatus, capability information of a terminal device served by the apparatus, or a grant-free transmission requirement of the apparatus.

15. The apparatus according to claim 11, wherein the receiver is further configured to receive an information reporting request message, wherein the information reporting request message is used to request the apparatus to send the information used for grant-free transmission unit configuration.

\* \* \* \* \*